Dec. 14, 1943.    J. H. SINGLETON    2,336,577
SPRAYING ATTACHMENT FOR CULTIVATORS
Filed July 23, 1942    3 Sheets-Sheet 1
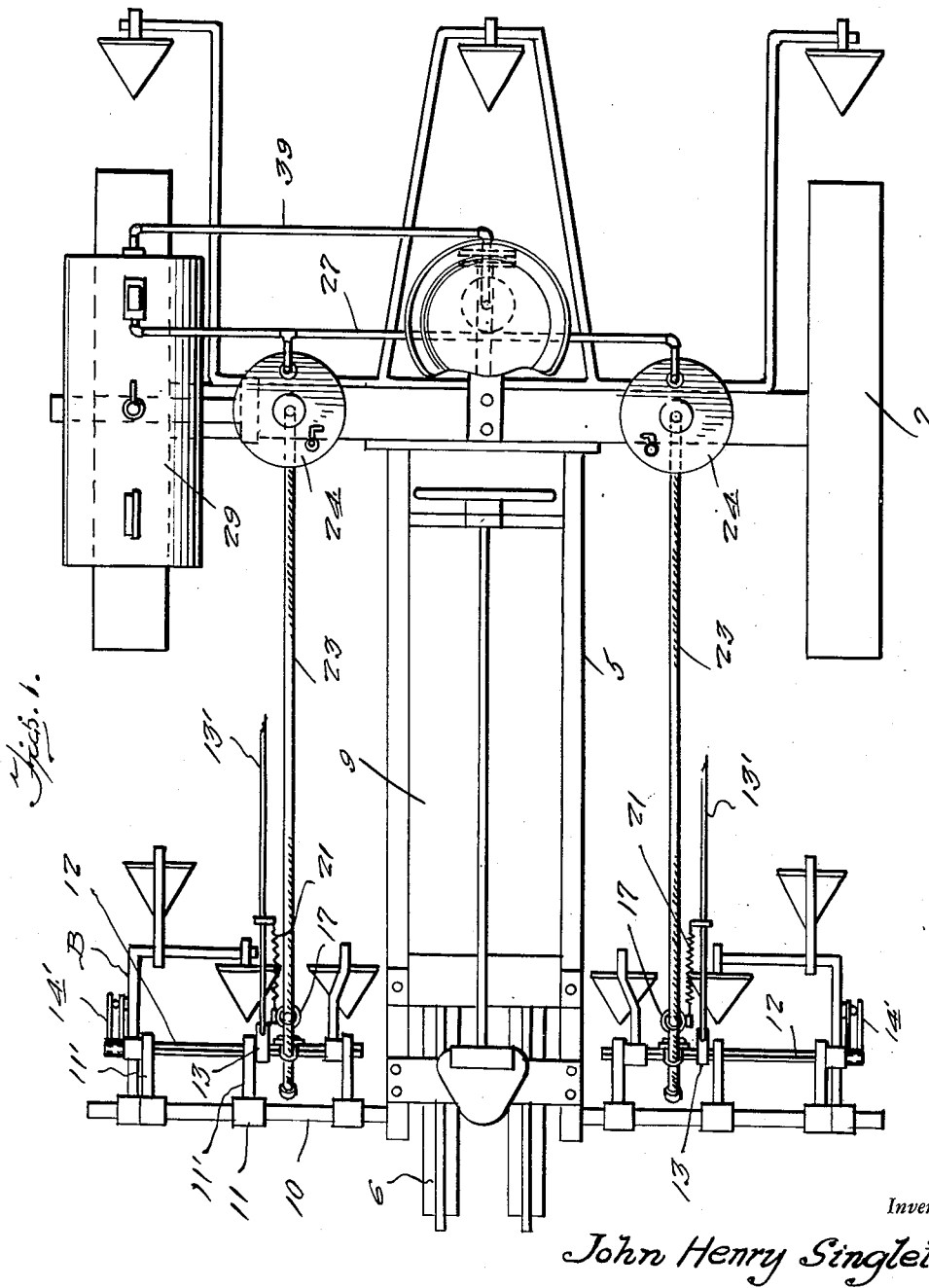
Inventor
John Henry Singleton
By Clarence A. O'Brien
and Harvey B. Jackson
Attorneys

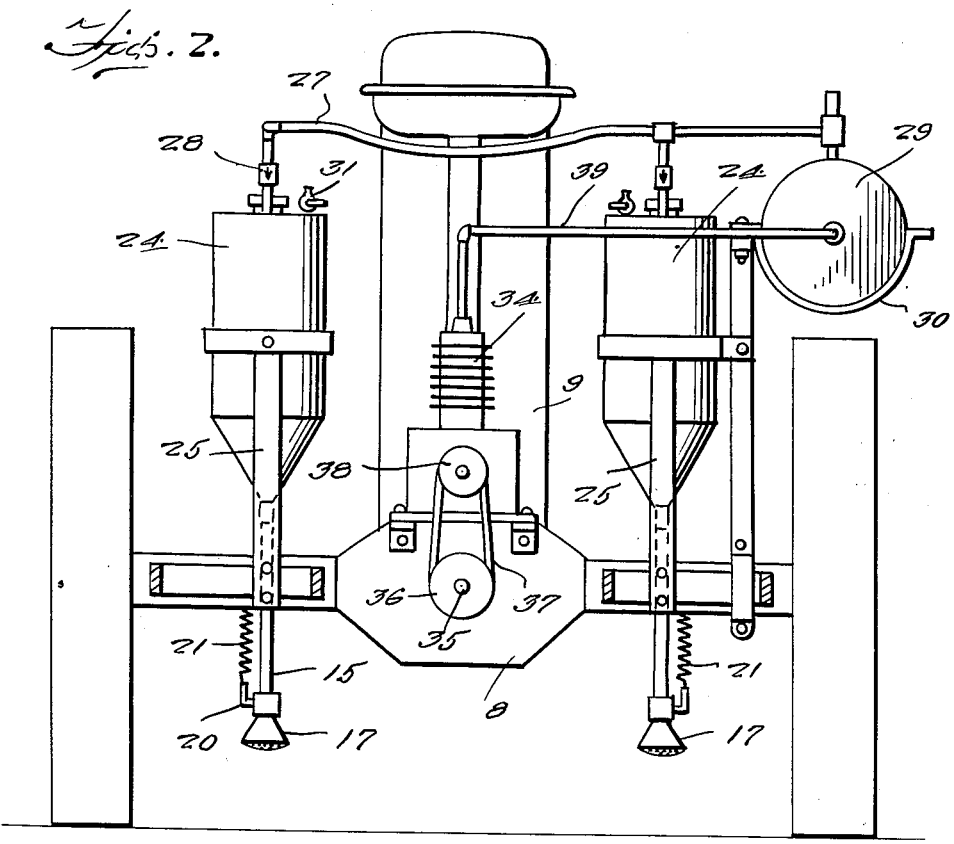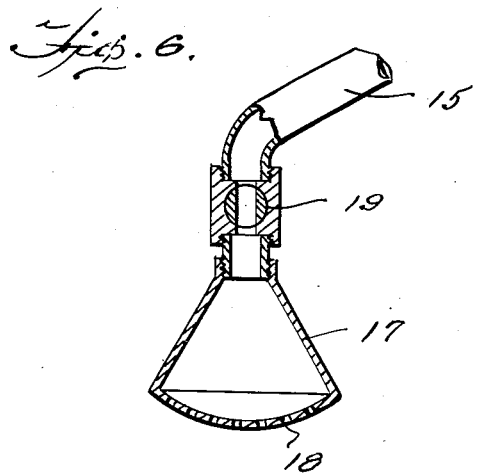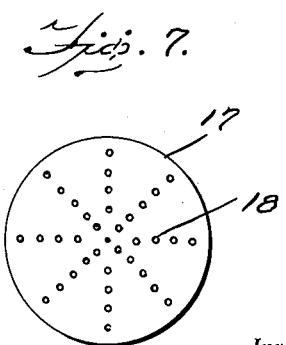

Dec. 14, 1943.    J. H. SINGLETON    2,336,577
SPRAYING ATTACHMENT FOR CULTIVATORS
Filed July 23, 1942    3 Sheets-Sheet 3
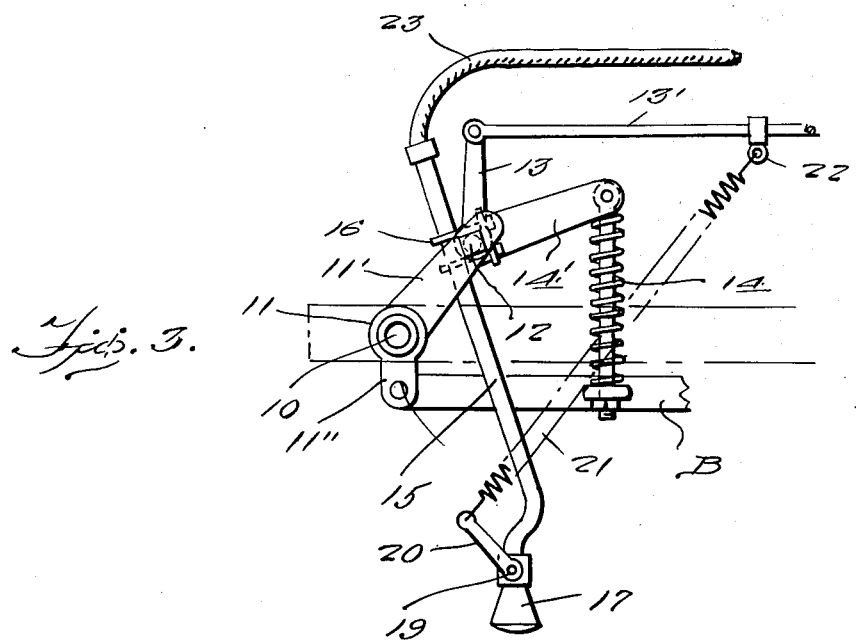
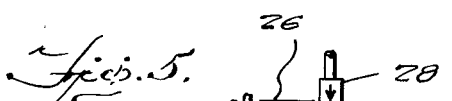
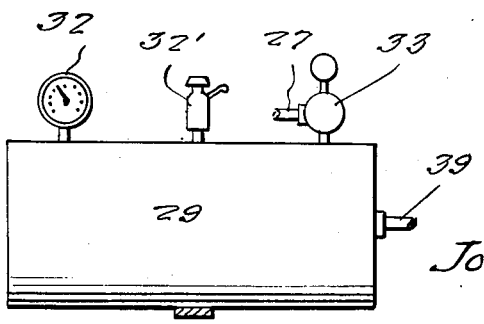
Inventor
John Henry Singleton
By Clarence A. O'Brien
and Harvey B. Jacobson
Attorneys Patented Dec. 14, 1943

2,336,577

UNITED STATES PATENT OFFICE 2,336,577

SPRAYING ATTACHMENT FOR CULTIVATORS

John Henry Singleton, Prattville, Ala.

Application July 23, 1942, Serial No. 452,075

3 Claims. (Cl. 97—179)

The present invention relates to new and useful improvements in spraying attachments for cultivators and has for its primary object to provide a device of this character adapted to be operated in connection with the gangs of a cultivator and employing the same as supports for the spray nozzles, the nozzles being controlled by valves connected with the cultivator lift mechanism in a manner so that when the cultivator plows are lifted, the liquid spray supply is cut off and when cultivation is resumed the spray is automatically turned on.

A further object is to provide an apparatus of this character of simple and practical construction, which is efficient and reliable in performance, relatively inexpensive to manufacture and install in operation and otherwise well adapted for the purposes for which the same is intended.

Other objects and advantages reside in the details of construction and operation as more fully hereinafter described and claimed, reference being had to the accompanying drawings forming part hereof wherein like numerals refer to like parts throughout and in which:

Figure 1 is a top plan view.

Figure 2 is a rear elevational view with parts shown in section.

Figure 3 is a side elevational view of one of the spray pipes and spray head shown in position attached to the cultivator lift mechanism.

Figure 4 is a side elevational view of the compressed air tank.

Figure 5 is a side elevational view of one of the liquid spray tanks with parts shown in section.

Figure 6 is a sectional view of one of the spray nozzles, and

Figure 7 is a bottom plan view thereof.

Referring now to the drawings in detail, wherein for the purpose of illustration I have disclosed a preferred embodiment of the invention, the numeral 5 designates a conventional form of tractor including the front wheel assembly 6, rear wheels 7, which are driven in the usual manner through the rear drive mechanism in the housing 8 from the engine 9 of the tractor.

Supporting rods 10 project laterally outwardly from each side of the tractor adjacent its front end on which are pivotally supported collars 11 having arms 11' extending upwardly and forwardly therefrom and arms 11" extending downwardly therefrom. Journaled in the upper ends of the arms 11' is a rock shaft 12 of square shape in cross-section, having a lever 13 rigidly attached thereto which is operated by a lift rod 13' extending rearwardly of the tractor to a position for manipulation by the driver.

The plow beam B is pivoted on the lower arm 11" and is connected to the rock shaft 12 by the link and arm 14 and 14', the latter being pivoted on the shaft 12. The cultivator plow lifting mechanism referred to is of conventional construction and accordingly a detailed explanation thereof is not deemed necessary.

Each of the rock shafts 12 has secured thereto a spray pipe 15 by means of U-clamps 16, the spray pipe extending substantially vertically as shown to advantage in Figure 3 of the drawings. To the lower end of the spray pipe is attached a nozzle or spray head 17 of substantially conical form and perforated in its bottom portion as shown at 18. Positioned in the pipe 15 adjacent the nozzle is a valve 19 adapted to control the supply of liquid spray entering the nozzle.

The valve 19 is actuated by means of a handle 20 to the outer end of which is attached a coil spring 21 connected to the lift rod 13' by means of a clamp 22 adjustably secured on the lift rod.

The valve 19 is of conventional construction and is normally closed when the plows and spray pipe are in a raised position by an internal spring (not shown), and the valve is arranged to be opened through the movement of the rod 13' when the plows and spray pipe are moved into their lower position.

To the upper end of the spray pipe 15 is attached a hose 23 leading to a liquid spray container 24 supported on the tractor by means of a bracket 25 from the rear axle thereof, the container 24 being of substantially cylindrical form and supported in upright position. One of the containers 24 is provided for the gang of plows at each side of the tractor.

The supply of liquid spray is adapted to be placed in the container through a cap 26 and a compressed air supply pipe 27 extends through the top of the container with its lower end terminating adjacent the bottom thereof to agitate the contents of the container when air under pressure is admitted thereto. The compressed air supply pipe 27 is provided with a check valve 28 adjacent each of the containers and the pipe 27 communicates with a compressed air tank 29 supported in a bracket 30 adjacent one side of the tractor.

Each of the containers 24 is provided with a pressure release valve 31 and the compressed air tank 29 is provided with a gauge 32, a safety valve 32' and also with an air pressure regulator 33 at the junction of the pipe 27 therewith.

An air pump 34 is operatively mounted on the tractor adjacent its rear end and is driven from a power take-off shaft 35 projecting rearwardly from the rear axle housing 8, the shaft being provided with a pulley 36 driving a belt 37 leading to a pulley 38 attached to the pump. The pump is connected to the compressed air tank 29 by means of a pipe 39.

From the foregoing it will be apparent that when the tractor is in use for cultivating purposes the pump 34 will be actuated so as to supply air under pressure to the compressed air tank which is then fed to the liquid containers 24 from which the liquid under pressure is supplied to the nozzles 17.

When the plows are lowered into cultivating position, the valve 19 is open so that a predetermined quantity of liquid spray is discharged upon the plants.

It is believed the details of construction, operation and advantages of the device will be readily understood from the foregoing without further detailed explanation.

Having thus described the invention what I claim is:

1. A spray apparatus for cultivators of a type in which the cultivator includes a plow lifting mechanism having a rock shaft actuated by a lift rod, said spray apparatus comprising a pipe secured in an upright position to the rock shaft for swinging movement thereby and connected to a source of supply and having a spray head at its lower end, a valve in the pipe normally arranged in a closed position, and spring means connecting the valve to the lift rod for opening the valve upon a predetermined movement of the lift rod and spray pipe in a direction to lower the plow.

2. A spray attachment for cultivators of a type in which the cultivator includes a plow lifting mechanism having a rock shaft actuated by a lift rod, said spray attachment comprising a spray pipe, means for adjustably securing the pipe in an upright position to the rock shaft for swinging movement thereby, a flexible hose connecting the upper end of the pipe to a source of supply, a spray head at the lower end of the pipe, a valve in the pipe normally arranged in a closed position, and spring means connecting the valve to the lift rod for opening the valve upon a predetermined movement of the lift rod and spray pipe in a direction to lower the plow.

3. A spray attachment for cultivators of a type in which the cultivator includes a plow lifting mechanism having a rock shaft actuated by a lift rod, said spray attachment comprising a spray pipe, means for adjustably securing the pipe in an upright position to the rock shaft for swinging movement thereby, a liquid supply tank connected to the pipe at its upper end, a compressed air tank connected to the liquid supply tank to maintain pressure in the supply tank, a spray head at the lower end of the pipe, a valve in the pipe normally arranged in a closed position, and spring means connecting the valve to the lift rod for opening the valve upon a predetermined movement of the lift rod and spray pipe in a direction to lower the plow.

JOHN HENRY SINGLETON.